United States Patent [19]

Saitoh et al.

[11] Patent Number: 4,514,744
[45] Date of Patent: Apr. 30, 1985

[54] ELECTROSTATIC COPYING DEVICE EMPLOYING THERMALLY FLUIDIZABLE MEDIUM ON PHOTOSENSITIVE BELT

[75] Inventors: Hiroyuki Saitoh; Yoshiki Kikuchi, both of Kanagawa, Japan

[73] Assignee: Fuji Xerox Co., Ltd., Tokyo, Japan

[21] Appl. No.: 535,119

[22] Filed: Sep. 23, 1983

[30] Foreign Application Priority Data

Sep. 24, 1982 [JP] Japan .................. 57-164919
Sep. 24, 1982 [JP] Japan .................. 57-164920

[51] Int. Cl.³ .................. G01D 15/06; G01D 15/12
[52] U.S. Cl. .................. 346/153.1; 346/76 PH
[58] Field of Search .................. 346/76 PH, 153.1; 400/118-120

[56] References Cited

U.S. PATENT DOCUMENTS 3,719,261  3/1973  Heinzer et al. .................. 346/76 PH Primary Examiner—Thomas H. Tarcza
Attorney, Agent, or Firm—Sughrue, Mion, Zinn, Macpeak, and Seas

[57] ABSTRACT

A recording and copying device capable of producing multiple copies from an original image using a single readout operation, while simultaneously being capable of reversing the image or shifting the image as desired. A photosensitive belt is provided having a light-shielding layer thereon capable of being fluidized or sublimated by heating. This layer is selectively heated by a thermal recording head, after which heated portions are removed by a transfer belt. The exposed photosensitive portions of the belt are then exposed and developed using toner particles, and the developed image transferred to a recording sheet.

12 Claims, 10 Drawing Figures

LIGHT

LIGHT

ELECTROSTATIC COPYING DEVICE EMPLOYING THERMALLY FLUIDIZABLE MEDIUM ON PHOTOSENSITIVE BELT

BACKGROUND OF THE INVENTION

The present invention relates to a recording device for recording image information by transferring a toner image onto a paper sheet.

An electrostatic copying device based on the xerographic principle (electrostatic photography) as a recording device for recording image information by transferring a toner image onto a paper sheet is well known. In such an electrostatic copying device, a photosensitive material is first uniformly charged, and then an image is projected thereonto with an optical system to form an electrostatic latent image on the photosensitive material. Upon developing the electrostatic latent image with toner particles, a toner image is produced. The toner image thus produced is transferred to a paper sheet and fixed with a fixing device. A recorded image is thus produced.

In this device it is possible to use ordinary paper for the recording medium, and it is very easy to obtain not only an unscaled (same size as original) reproduced image, but also an enlarged or reduced image simply by changing the magnification of the optical system.

The conventional device described above, however, has defects. One such defect is the fact that, when a plurality of copies of an original are required, a corresponding number of copying operations must be performed. Another is that, due to the way in which the optical image is projected onto the photosensitive material, it is impossible or at least difficult to vary the recorded image in ways other than by varying the of magnification, such as reversing the image or partially shifting the image.

In view of the drawbacks mentioned above, an object of the present invention is to provide a recording device which is capable not only of producing plural copies of an original image using only a single readout operation, but also of processing the image without the above-noted drawbacks inherent in the conventional system.

SUMMARY OF THE INVENTION

In satisfaction of the above and other objects, in accordance with the present invention there is provide a recording device which employs as a photosensitive medium a photosensitive material capable of generating an electromotive force upon irradiation by light. Specifically, a photovoltaic material is used in combination with an opaque thermal transfer medium coated uniformly on one surface of the photosensitive material. In operation, the thermal transfer medium is preferentially removed from the photosensitive layer by means of a thermal head and an associated transfer device, and a latent image is formed by a suitable exposure process. A toner image is formed on this latent image. With this arrangement, it becomes possible to perform recording operations repeatedly until the light-shielding image of the thermal transfer medium is removed. Further, since the thermal head is driven by treating the image signal electrically, it becomes possible to easily process the image in various ways.

DESCRIPTION OF THE PREFERRED EMBODIMENTS

Figure 1:
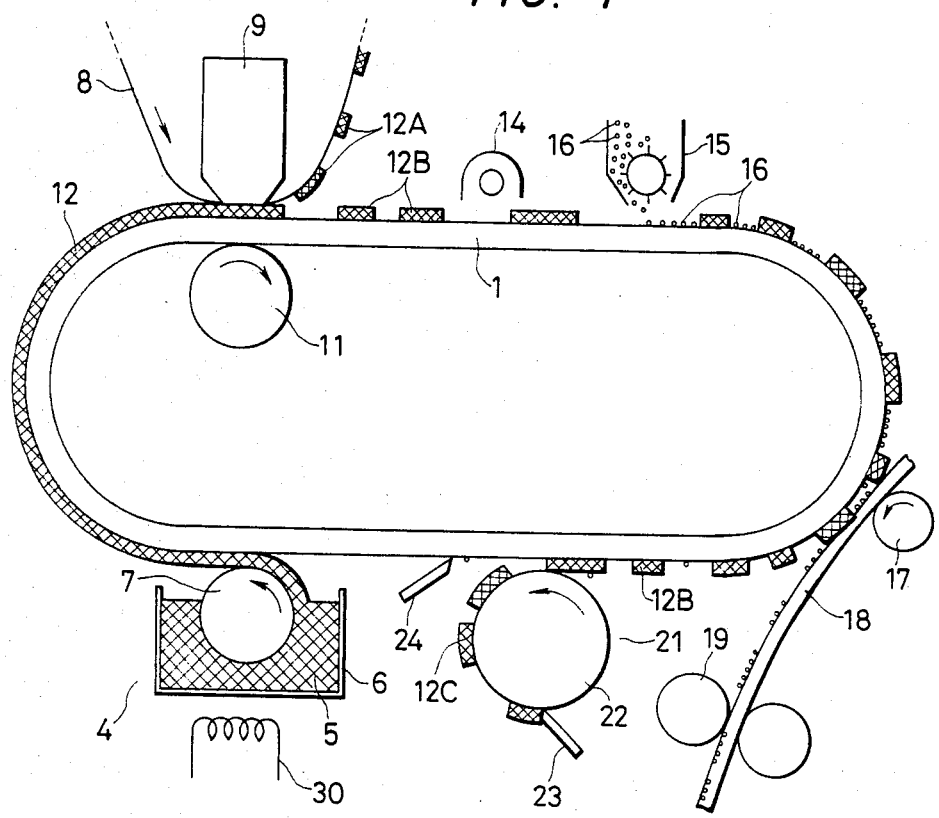
FIG. 1 is a schematic side view of a preferred embodiment of an electrostatic recording device according to the present invention.
Figure 2:
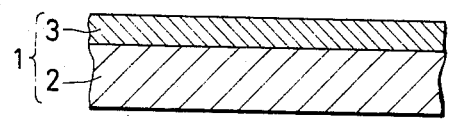
FIG. 2 is a cross-sectional view of a photosensitive belt used in the recording device of FIG. 1.

Referring to FIG. 1, a preferred embodiment of a recording device of the invention includes an endless photosensitive belt 1 rotated in clockwise direction in the figure. The endless belt is composed of a substrate 2 of flexible material, such as nickel alloy or aluminum, having on one surface thereof a photosensitive layer 3 formed by binding fine particles of a photovoltaic material such as zinc oxide (ZnO)or titanium oxide TiO) with a suitable resin. A coating device 4 is disposed below a left side portion of the endless belt 1. The coating device 4 includes a tank 6 for holding a supply of thermal image transfer medium 5 and a coating roller 7 for coating the photosensitive belt 1 with the thermal image transfer medium 5. The thermal image transfer medium 5 in the tank 6 is heated to a predetermined temperature by a heating device 30 of known construction. The thermal image transfer medium 5 is insulating material capable of being sublimated or fluidized by heating. In this embodiment described, the thermal image transfer medium is preferably a mixture of ester wax, carnauba wax, carbon black and a softening agent in a ratio suitable to provide a melting point of about 70° C. and to exhibit thermal fluidization and light shielding properties. The coating roller 7 is adapted to uniformly coat one surface of the photosensitive layer 3 with the thermal image transfer medium 5 to thereby form a light-shielding layer 12 thereon having a thickness on the order of several microns.

A thermal image transfer belt 8 is provided at the left side portion of the recording device. The image transfer belt 8 takes the form of an endless belt driven in the direction of the arrow by a suitable driving system (not shown). A lower end portion of the belt 8 is in contact on its inside surface with a heat generating surface of the thermal head 9, and on its outer side surface with the upper surface of the thermal image transfer medium 5. A pressure roller 11 presses against the underside portion of the belt 8 to urge the photosensitive belt 1 against the thermal image transfer belt 8 and to drive the belt 1 clockwise.

Image information supplied from a host system (not shown) to the thermal head 9 is in the form of electrical signals. Accordingly, the head is driven to selectively actuate a plurality of heat generating elements arranged in a row extending orthogonal to the belt direction to thereby selectively heat the light shielding layer 12 on the endless belt 1. Activation of a heat generating element corresponds to white (background) image information, while no activation of the element corresponds to black (printing portion) image information. Portions 12A of the light-shielding layer 12 of the thermal image transfer medium 5 which are heated by the heat generating elements are fluidized or sublimated.

Figure 3A:
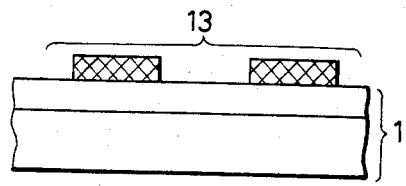
FIGS. 3A through 3C illustrate steps of image recording in the device of FIG. 1.
Figure 3B:
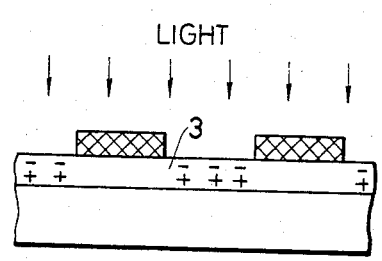

In this embodiment, the portions 12A are fluidized and transferred onto the thermal image transfer belt 8 to form a negative light-shielding image thereon. Remaining portions 12B of the light-shielding layer 12 are left on the photosensitive endless belt 1 to form a positive light-shielding image 13 (FIG. 3A). The thermal image transfer belt 8 is equipped with a thermal image transfer medium recovery mechanism (not shown) to recover the medium thereon for reuse. The mechanism may be similar to a thermal image transfer recovery device described below. The negative light-shielding image formed on the photosensitive belt 1 is moved rightwardly, as shown in FIG. 1, with the the belt 1 passing beneath an exposing device 14. As indicated in FIG. 3B, the device 14 is equipped with a fluorescent lamp arranged traversely to the photosensitive belt 1 for exposing the photosensitive belt through the positive light-shielding image 13. It is also possible to use a plurality of fluorescent lamps arranged parallel to each other and traversely to the belt 1. Upon exposure, an electromotive force is generated in portions of the photosensitive belt 1 which are covered by the light-shielding layers 13, and thus a voltage, typically 300–500 mV, appears across the photosensitive layer 3. Thus, a positive electrical latent image, complementary to the light-shielding image, is formed on the photosensitive belt 1.

Figure 3C:
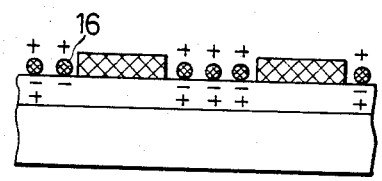

A developing device 15 is provided at the downstream side of the exposing device 14. The developing device 15 contains toner particles 16 charged with a polarity opposite that of the charge in the exposed portions of the photosensitive layer 3. The toner particles 16 are attracted to and adhere to the exposed portions of the photosensitive layer 3, as shown in FIG. 3C, in the same way as in the conventional electrostatic copying machine to thus form a positive toner image.

An image transfer device 17 is provided at the lower right side portion of the recording device. The image transfer device 17 may be a transfer roll which attracts toner particles electrostatically as shown in FIG. 1, or it may take the form of a corona discharge device. When the toner image arrives at the transfer device 17, it is transferred onto a paper sheet 18 supplied thereto from a paper sheet supply tray (not shown). The paper sheet 18 having the toner image thereon is fed between a pair of fixing rolls 19 by which it is heated and fixed. Then the paper sheet 18 is discharged to a paper discharge tray (not shown).

The light-shielding image left on the photosensitive belt 1 after the toner image is transferred to the paper sheet 18 is carried to a thermal image transfer medium recovery device 21. The device 21 is composed of a heating roll 22 and a recovery blade 23 in contact with a surface of the roll 22. The heating roll 22, which is rotated at substantially the same peripheral speed as the photosensitive belt 1, heats the light-shielding layer portions 12B left on the belt 1 to fluidize them so that they can be transferred to the heating roll 22. The light-shielding layer portions 12C transferred to the heating roll 22 are scraped away by the recovery blade 23 and collected on a recovery tray (not shown).

The surface of the photosensitive belt 1 from which the light-shielding layer portions 12B are removed is cleaned by a toner cleaning blade 24. It is possible to remove remaining toner particles 16 by other cleaning means, for instance, a doctor blade. After the surface of the photosensitive belt 1 is cleaned completely, a new light-shielding layer 12 is formed on the belt 12 by the coating device 4 for the next recording operation.

The foregoing description relates to the operation of the recording device of the invention in which a single copy of each image information is produced. In a case where a plurality of copies are to be produced from a single optical image, the thermal head 9 and the thermal image transfer belt 8 are rendered inoperative after the light-shielding image is formed. More specifically, the thermal head 9, together with the thermal image transfer belt 8, are moved away from the belt 1. Also, the coating device 4 and the thermal image transfer medium recovery device 21 are moved away after the formation of the light-shielding image. Once this has been done, the light-shielding image formed on the photosensitive belt 1 can be used repeatedly. That is, at an initial stage, the coating device 4 and the thermal image transfer belt 8, together with the thermal head 9, are in positions as shown in FIG. 1. Also, the thermal image transfer medium recovery device 21, together with the recovery blade 24, are lowered so that they are disengaged from the photosensitive belt 1. In this state, the light-shielding layer 12 is formed on the photosensitive belt 1 by the coating device 4 and image information signals are supplied to the thermal head 9 to form a negative light-shielding image on the belt 1. Thereafter, the coating device 4 and the thermal head 9, together with the image transfer belt 8, are disengaged from the photosensitive belt 1. The photosensitive belt 1 continues to run with the negative light-shielding image thereon. During each subsequent revolution of the photosensitive belt 1, a positive electrostatic latent image, and hence a positive toner image, is formed, resulting in recording of the image information on the paper sheet 18. After a desired number of copies have been made in this manner, the coating device 4, the thermal head 9 and the recovery device 21 are returned to the positions shown in FIG. 1. Since the negative light-shielding image 12B is maintained exactly as it is on the photosensitive belt 1 during the continuous rotation thereof, there is no degradation of the light-shielding image even if a large number of coping operations are performed. Thus, high quality image recording is achieved.

Figure 4A:
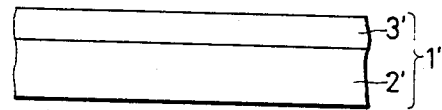
FIGS. 4A through 4C show similar steps of image recording in a modification of the recording device of FIG. 1.
Figure 4B:
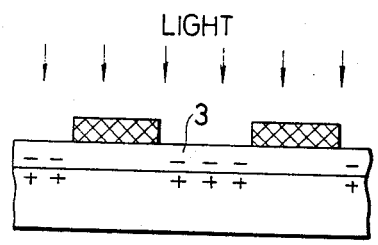
Figure 4C:
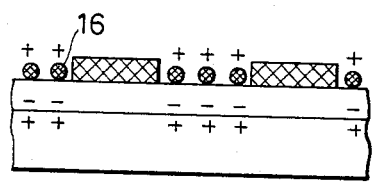

FIGS. 4A through 4C show formation of an electrostatic latent image in another embodiment of the photosensitive belt 1' of the present invention. In this case, the electric latent image is formed using the PN junction of an optical semiconductor. The belt construction includes, for example, a flexible substrate 2' made of cadmium sulfide (CdS), which is an n-type semiconductor capable of producing an opto-contact electromotive force. A photosensitive layer 3' of a p-type semiconductor such as copper sulfide ($Cu_2S$) or silicon (Si) is formed on one surface of the substrate. In this case, portions of the photosensitive layer 3' which are irradiated by light are charged with a negative polarity as indicated in FIG. 4B. Therefore, by charging the toner particle 16 with a positive charge, a toner image is formed as shown in FIG. 4C.

Figure 5:
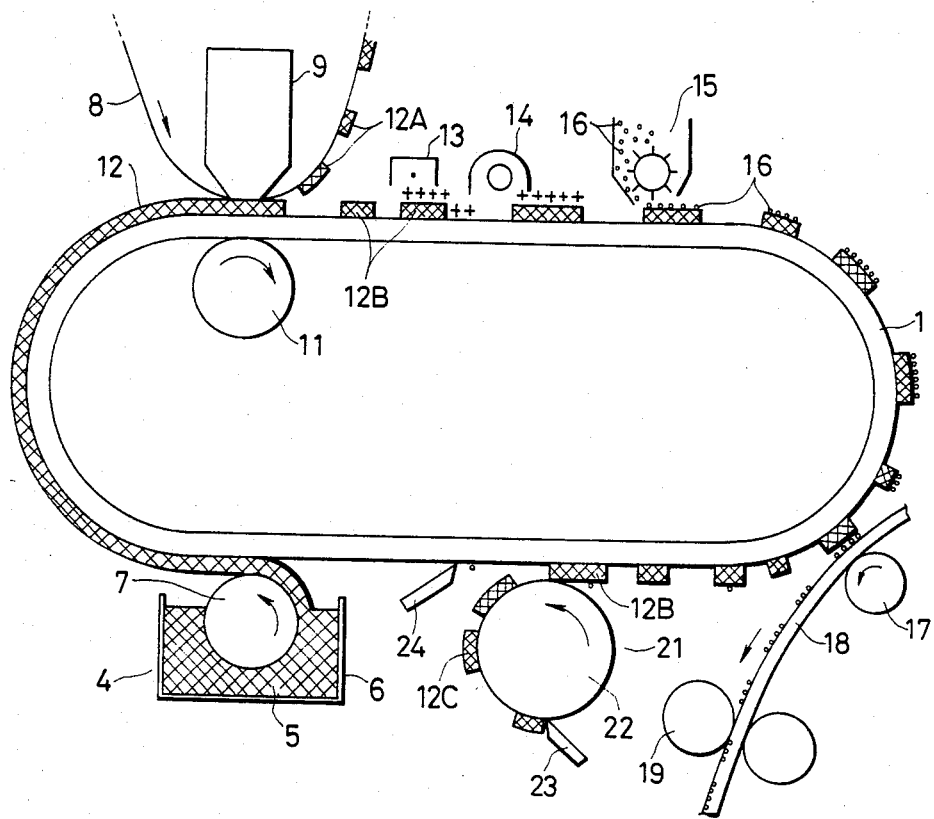
FIG. 5 is a schematic side view of an alternate embodiment of a recording device of the invention.

In another embodiment of the present invention shown in FIG. 5, a photoconductive material is used as the photosensitive belt. An insulating thermal image transfer medium is uniformly formed on one surface of this belt. The step of selective removal of the thermal image transfer medium by means of the thermal head, the charging step, and the exposing step to form the electrostatic latent image and hence the toner image, and the devices for performing these steps, are the same as described with reference to FIG. 1.

Figure 6:
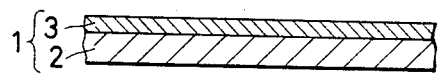
FIG. 6 is a cross-sectional view of a photosensitive belt used in the recording device of FIG. 5.

In the embodiment of FIG. 5, the photosensitive belt 1 is composed of a flexible substrate 2 formed, for instance, of a nickel alloy. A photosensitive layer 3 of, for example, selenium (Se) is formed on the substrate 2 as shown in FIG. 6. A corona charger 13 is provided between the thermal head 9 and the exposing device 14. The thermal head 9 acts to fluidize portions of the insulating light-shielding layer 12 which correspond to black (printing) image portions in a positive image. The corona charger 13 uniformly charges the insulating light-shielding images 12B left on the photosensitive belt 1 since the photosensitive layer 3 has a high resistance in dark portions. Thereafter, the photosensitive layer 3 is exposed by the exposing device 14 with the insulating light-shielding image as a mask. Upon exposure, the resistance of portions of the photosensitive layer 3 having no light-shielding layer 12B thereon is reduced, and charges in these portions are dissipated while charges in other portions are held. Thus, an electrostatic latent image corresponding to the pattern of the insulating light-shielding layer is formed on the insulating light-shielding layer 12B.

Toner particles 16, supplied by the developing device 15 and having an opposite polarity to that of the charges forming the latent image, adhere to the insulating light-shielding layer to form a positive toner image. The toner image is transferred by the transfer device 17 onto the paper sheet 18 and fixed thereon by the fixing rolls 19 in the embodiment of FIG. 1. The recovery of the used medium 12 is performed in the same way as described with respect to the embodiment of FIG. 1 and the modification of that device shown in FIG. 5 to accommodate the formation of plural copies.

In the described embodiments, an image is produced electrically using a thermal head. Therefore, it is possible to apply to the recording device of the present invention any of various image processing techniques which have been established for image processing devices utilizing a sequential line scanning recording system. Further, usage of the thermal head in forming the light-shielding image makes possible secondary treatments such as a doubling or meshing of black areas. Moreover, by changing the voltage applied to the thermal head or changing the width of pulses applied to the thermal head, the amount of light-shielding medium (12A) transferred to the thermal image transfer belt 8 may be changed to produce images which give impressions different from the usual impression.

We claim:

1. A recording device comprising: a photosensitive belt capable of producing electromotive force upon irradiation with light, said photosensitive belt having on one surface thereof a light-shielding layer of a material capable of being fluidized or sublimated by heating; light-shielding image forming means for selectively heating said light-shielding layer and removing heated portions of said light-shielding layer from said photosensitive belt to form a light-shielding image thereon; latent image forming means for exposing said photosensitive belt carrying said light-shielding image to form a latent image on said photosensitive belt; developing means for developing said latent image with toner particles to form a toner image; image transfer means for transferring said toner image to a paper sheet; and fixing means for fixing said toner image to said paper sheet.

2. The recording device as claimed in claim 1, wherein said photosensitive belt is made of a photoconductive material and said light-shielding layer is made of an insulating material.

3. The recording device as claimed in claim 2, wherein said photosensitive belt comprises a flexible substrate and a surface layer on said flexible substrate of fine particles of photovoltaic material belt in a resin.

4. The recording device is claimed in claim 3, wherein said substrate comprises a material selected from the group consisting of nickel alloys and aluminum, and wherein said photovoltaic material comprises a material selected from the group consisting of zinc oxide and titanium oxide.

5. The recording device of claim 2, wherein said material capable of being fluidized or sublimated by heating comprises a thermal image transfer medium containing a mixture of ester wax, carnauba wax, carbon black and a softening agent in a ratio suitable to provide a melting point of approximately 70° C.

6. The recording device as claimed in claim 5, wherein a thickness of said thermal image transfer medium is on the order of several microns.

7. The recording device as claimed in claim 2, wherein said light-shielding image forming means comprises a thermal recording head comprising a plurality of electrically activatable thermal recording elements arranged in a row extending orthogonal to a direction of movement of said photosensitive belt.

8. The recording device as claimed in claim 6, wherein said light-shielding image forming means further comprises an image transfer belt having an outer surface in contact with an outer surface of said photosensitive belt and being disposed to run between said thermal recording head and said photosensitive belt.

9. The recording device as claimed in claim 2, further comprising a supply of said material capable of being fluidized or sublimated, and means for coating said material onto said photosensitive belt.

10. The recording device as claimed in claim 2, wherein said latent image forming means comprises optical semiconductor means, and wherein said photosensitive belt comprises a flexible substrate made of cadmium sulfide and a photosensitive layer of a material selected from the group consisting of copper sulfide and silicon formed on a surface of said substrate.

11. The recording device as claimed in claim 2, wherein said light-shielding image forming means comprises a flexible substrate made of a nickel alloy and a photosensitive material made of selenium formed on a surface of said substrate.

12. The recording device as claimed in claim 10, wherein said light-shielding image forming means comprises a thermal recording head comprising a plurality of electrically activatable recording elements arranged in a row extending orthogonal to a direction of movement of said photosensitive belt, and a corona charger arranged adjacent to said recording head in said direction of movement of said belt.

* * * * *